(No Model.)
J. H. CHRISTIAN & F. STANLEY.
PLOW AND CULTIVATOR.
No. 451,806. Patented May 5, 1891.
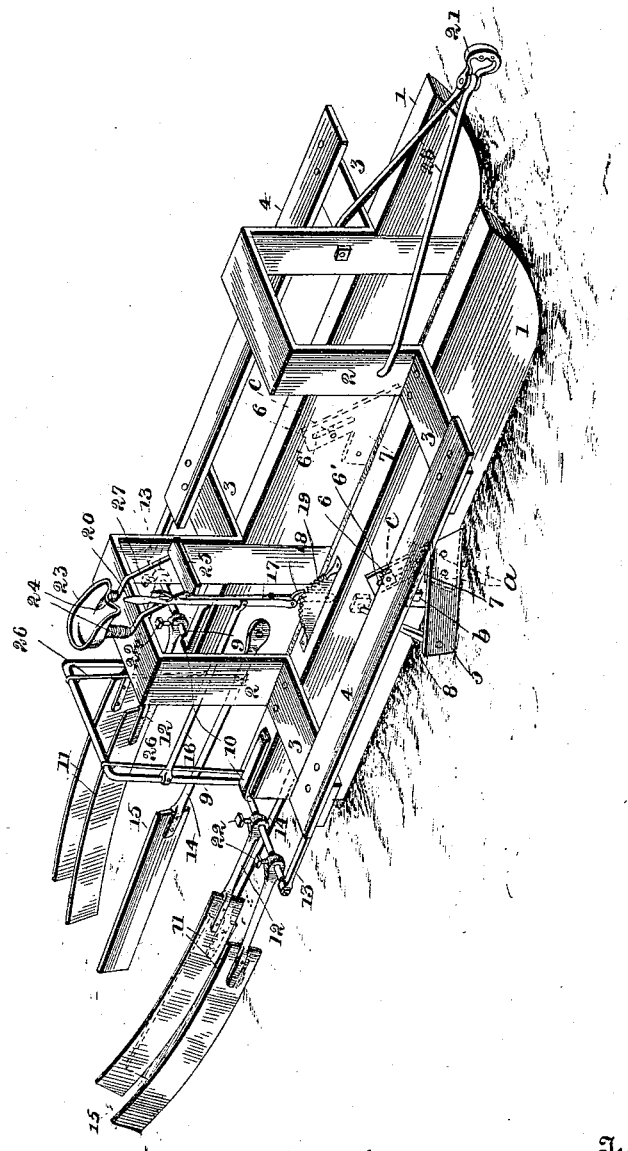
Witnesses
John Muie
Emma Arthur
Inventors
John H. Christian
Frank Stanley
By their Attorneys
Knight Bros.

UNITED STATES PATENT OFFICE.

JOHN H. CHRISTIAN AND FRANK STANLEY, OF WABAUNSEE COUNTY, KANSAS.

PLOW AND CULTIVATOR.

SPECIFICATION forming part of Letters Patent No. 451,806, dated May 5, 1891.

Application filed July 28, 1890. Serial No. 360,127. (No model.)

*To all whom it may concern:*

Be it known that we, JOHN H. CHRISTIAN and FRANK STANLEY, citizens of the United States, residing at Wabaunsee county, in the State of Kansas, and whose post-office is Dover, in the county of Shawnee, in said State, have invented a new and useful Plow and Cultivator for Listed Corn and other Agricultural Products Planted in Like Manner, of which the following is a specification.

Our invention relates to a plow and cultivator for listed corn and other plants listed in and to be cultivated in like manner, in which are runners secured in position by benches, said runners provided with blades or shares for cutting off weed-roots and stirring up and mellowing the soil and adjustably attached to the runners, operating in conjunction with which are, extending to rearward and provided with suitable mechanism for operating the same, curved blades or shares for further pulverizing the soil, covering up the weeds, and turning the soil toward and around the corn, and guards or fenders for the protection of the plants.

The object of our invention is to provide a plow and cultivator for listed corn and other plants and products listed or planted and to be cultivated in like manner.

The accompanying drawing illustrates how this object is attained, in which the runners 1 are secured in position at the required distance apart by the benches 2, attached to the inner face and top edge of the runners and having the arms or lateral extensions 3 supporting the side bars 4. To the outer face of the runners are attached adjustably the shoes 7 by the bolts *b* and *c* in the face-plate 6 and adjustable by the bolt *c* in the slot 6'. To these shoes are secured by means of bolts through the bolt-holes *a a* the blades or shares 5, straight and extending outwardly and rearwardly, and braced and strengthened at their outer ends by the brace-rods 8, and set by the inclination of the share-plates at an angle to the bottom line of the runner. The depth to which these shares shall enter the soil is adjusted by means of the bolts through the slot in the face-plate 6. To the upper edge rear end of the runners are secured the journal-blocks 10, in which the bent rock-shaft 9 is journaled, and by which it is secured to the runners. The outer ends of the rock-shaft rest in eyes in the bars 13, attached to the side bars 4, and are secured by nuts on the ends of the shaft. To the rock-shaft 9, adjustably by the set-screws 22, are attached by the arms 12 the backwardly-extending inwardly-curved blades or shares 11, which are retained at a greater or less depth in the soil by the operation of the rock-shaft operated through the rod 16 by the lever 17, secured to the inner face of the runner and retained in position by the pawl 18, engaging the ratchet-plate 19 and operated by the thumb-latch 20. To the inner face of rear ends of the runners are attached by the rods 14 the fenders 15, loosely, and when not in use held up and when in use held in position by the rods 26, suspended to the rock-shaft. The rear bench 2 supports the seat 23 upon the springs 24, secured to the upper face of the bench and securing and attaching the arms 27, which support the foot-rest 25. To the outer face of the sides of the forward bench are attached the bars 28, which, extending forward, form the hitching-attachment 21, in which a tongue may be inserted or a clevis and link attached.

The operation of our invention is as follows: The runners run at the bottom of the list-furrow, one on either side of the plant-row. The blades or shares 5 cut the soil on either side to the depth of the list-furrow, or any desired depth, as adjusted by the bolt in the slot in the face-plate, cutting off all weeds and loosening, raising, and mellowing the soil to that depth. The curved blades 11 still further pulverize the soil and turn it toward and into the list-furrow around the plant. The plant is protected and prevented from being covered up by the fenders 15. The depth to which the curved blades or shares penetrate the soil is regulated by the lever 17, through the rod 16, operating on the rock-shaft 9, to which the curved blades are adjustably attached and on which they may be set nearer to or farther from the plant-row and held in place by the set-screws 22, or the blades may be lifted entirely out of the ground and are retained in any desired position by the pawl 18 engaging the ratchet-plate 19. If the soil and crops have become weedy, the weeds are pressed down by the arms 3, the roots cut off by the blades 5, and they are covered up and extirpated by the curved blades 11, and the ground left mellow and perfectly clean. The corn and other crops listed in are thus cleansed and cultivated in a manner unequaled by any device yet brought into use.

Having thus described our invention, what we claim as our invention, and desire to secure by Letters Patent, is—

1. A plow and cultivator for listed corn, comprising the runners retained in position by benches, the shoes adjustably attached to the runners, carrying blades or shares extending outwardly and rearwardly, rods bracing the outer ends of the blades or shares, the rock-shaft journaled to the runners, its ends secured in eyed bars having arms adjustably attached, carrying rearwardly-extending curved blades, rod 16, and ratchet-lever 17, and the fenders pivoted to the runners and supported by depending rods, substantially as shown and described, and for the purposes specified.

2. In an improved plow and cultivator for listed corn, the combination of runners retained in position by benches and provided with shoes adjustable about their retaining-bolts, carrying blades or shares extending outwardly and rearwardly and having bracing-rods at their outer extremities, with a rocking shaft journaled to the runners, its ends secured in eyed bars having arms adjustably attached, carrying rearwardly-extending curved blades, rod 16, and ratchet-lever 17, and the fenders pivoted to the runners and supported by depending rods, all substantially as shown and described, and for the purposes specified.

3. In a plow and cultivator for listed corn, the combination of the blades or shares 5 with the curved blades or shares 11, adjustably attached by arms to a rocking shaft and secured in position thereon by set-screws, fenders retained in position by rods depending from said rocking shaft, and means for carrying, securing, propelling, and operating the same, substantially as shown and described, and for the purpose specified.

4. In an improved plow and cultivator for listed corn, the combination of runners retained in position by benches having lateral arms supporting side bars, with a rocking shaft journaled to the runners, its ends supported in eyed bars having arms adjustably attached, carrying rearwardly-extending curved blades, rod 16, and ratchet-lever 17, and the fenders pivoted to the runners and supported by depending rods, substantially as shown and described, and for the purposes specified.

JOHN H. CHRISTIAN.
FRANK STANLEY.

Witnesses:
W. L. CORNELIUS,
E. D. LIVINGSTON.